United States Patent [19]

Krasborn et al.

[11] 4,373,130

[45] Feb. 8, 1983

[54] CONCEALED ELECTRIC HEATING ELEMENT ARRANGEMENT FOR VEHICLE WINDSHIELDS

[75] Inventors: Gottfried Krasborn, Aachen; Paul Roentgen, Rott-Roetgen; Wilhelm Meier, Kohlscheid; Josef Erdweg, Aachen, all of Fed. Rep. of Germany

[73] Assignee: Saint-Gobain Vitrage, France

[21] Appl. No.: 114,079

[22] Filed: Jan. 21, 1980

[30] Foreign Application Priority Data

Jan. 24, 1979 [DE] Fed. Rep. of Germany ....... 2902748

[51] Int. Cl.³ .......................... H05B 3/26; A47L 1/16
[52] U.S. Cl. .................................. 219/203; 52/171; 219/522; 219/543; 219/547; 338/308; 338/314
[58] Field of Search ............... 219/203, 522, 543, 547, 219/464; 52/171; 338/308, 309, 314

[56] References Cited

U.S. PATENT DOCUMENTS

| | | | |
|---|---|---|---|
| 2,895,157 | 7/1959 | Kocourek . | |
| 3,738,252 | 6/1973 | Cardinale | 219/203 X |
| 3,789,191 | 1/1974 | Spindler | 219/203 X |
| 3,789,192 | 1/1974 | Spindler | 219/203 X |
| 3,974,360 | 8/1976 | Panzarino | 219/543 |
| 4,004,126 | 1/1977 | Boaz | 219/203 |
| 4,057,707 | 11/1977 | Allen | 219/543 |
| 4,109,044 | 8/1978 | Marriott | 219/522 |
| 4,109,133 | 8/1978 | Hamle et al. | 219/203 |

FOREIGN PATENT DOCUMENTS

| | | | |
|---|---|---|---|
| 588397 | 12/1959 | Canada | 219/543 |
| 1911561 | 8/1971 | Fed. Rep. of Germany . | |
| 2248094 | 5/1973 | Fed. Rep. of Germany . | |
| 2507037 | 2/1976 | Fed. Rep. of Germany . | |
| 583495 | 12/1976 | Switzerland . | |
| 737058 | 9/1955 | United Kingdom | 219/543 |

Primary Examiner—A. Bartis
Attorney, Agent, or Firm—Pennie & Edmonds

[57] ABSTRACT

The windshield for a motor vehicle is characterized by a transparent panel having a lower region normally outside the driver's field of vision and where at least one windshield wiper is located in the rest position of the wiper. An electric resistance heating element, formed either as a continuous layer or as a plurality of individual conductors connected in parallel by bus bars, is carried on the windshield only in the lower region for heating the area on which the wipers rest. A continuous layer of a heat radiation absorbing ceramic material opaque to ambient light and coextensive with the area of the heating element is disposed on the windshield between the heating element and the windshield wiper to shield the heating element from view from the front of the windshield and to uniformly distribute heat over the lower portion of the windshield. The windshield is a laminate including inner and outer glass panes with a plastic layer therebetween. The heating element and opaque layer may be disposed on the inner and outer surfaces of the outer pane, respectively. Alternatively, the heating element can be disposed between the panes and the opaque layer can be provided on either the inner or outer surface of the outer pane. The opaque layer can be provided on the exposed surface of the inner pane, the heating element disposed thereon, and a second opaque layer of lower heat conductivity provided thereover to form a protective covering. The opaque layer is preferably is dark in color, e.g., a black enamel.

14 Claims, 6 Drawing Figures

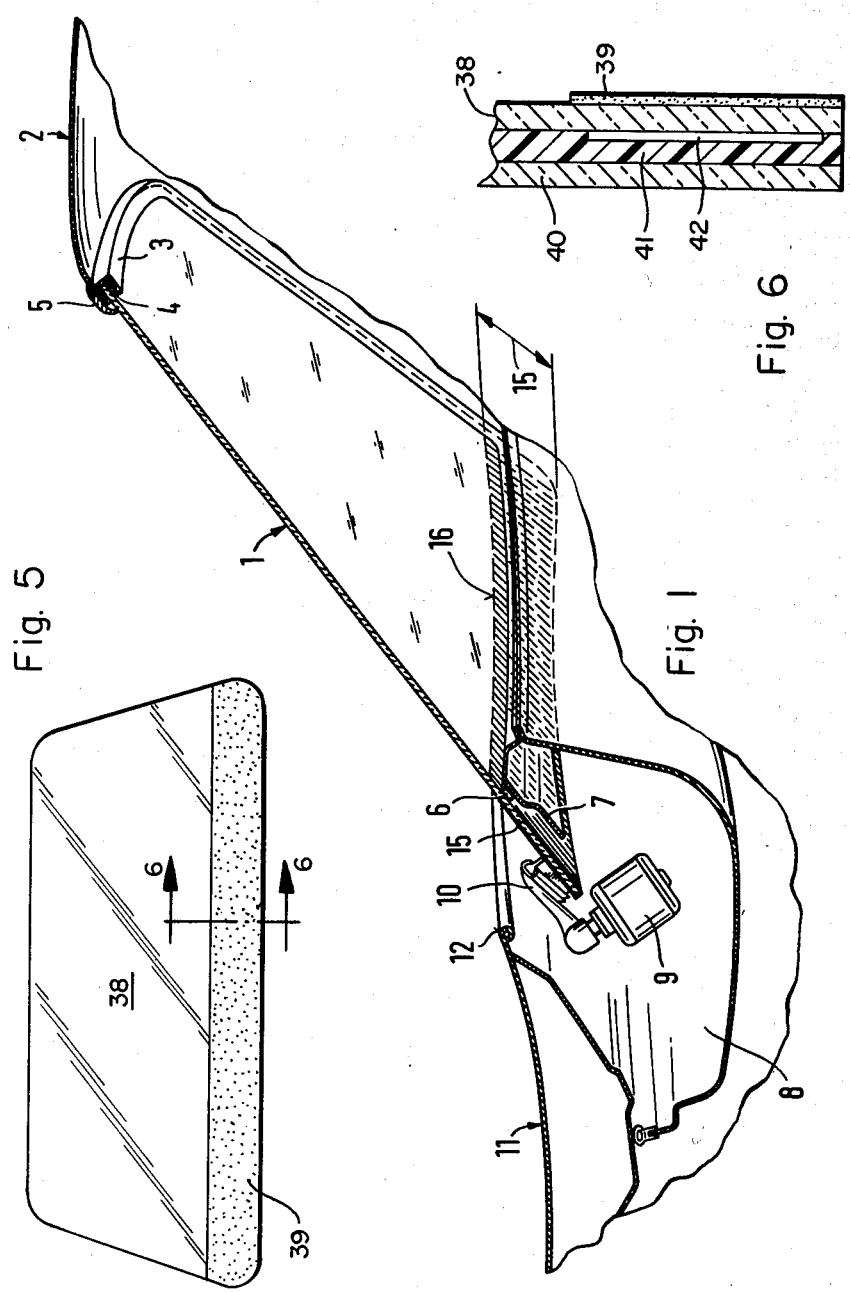

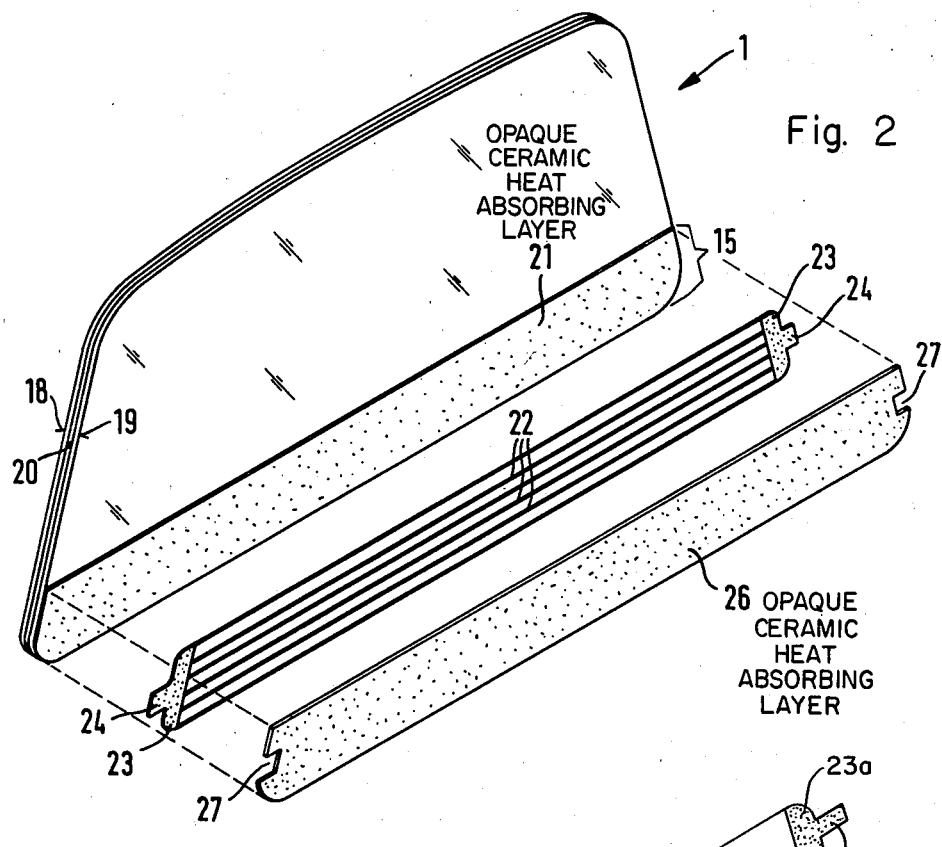
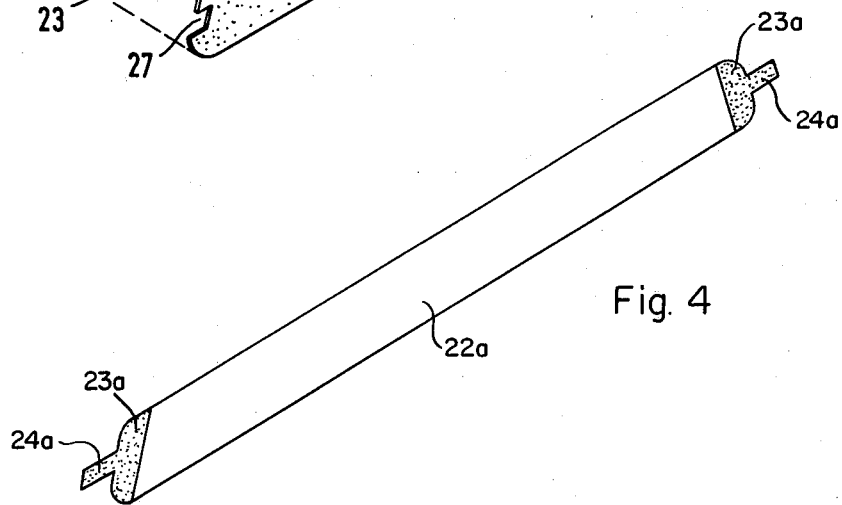

CONCEALED ELECTRIC HEATING ELEMENT ARRANGEMENT FOR VEHICLE WINDSHIELDS

DESCRIPTION

1. Technical Field

The invention relates to a windshield for motor vehicles and particularly a windshield that extends into a space or recess below the level of the hood. The portion of the windshield which extends into the space serves as a repository for the windshield wipers in their rest position.

2. Background of the Invention

Motor vehicles having their windshield wiper or wipers mounted below the level of the hood of a vehicle are known to the prior art. As has now been recognized, there is a danger, particularly during the cold season, that the windshield wiper in its rest position may become blocked on the windshield. Thus, blocking may occur solely because of cold weather and icing. Also, blocking may result from a snowfall. To this end, snow may fall directly into the recessed space or slide down the windshield to settle in the space around the mounting and each windshield wiper thereby to impede their proper functioning.

The invention is directed to the task of overcoming the problems and disadvantages of a windshield of the type previously discussed, namely a windshield that extends into a recessed space below the level of the hood, and as such the improved windshield permits each of several windshield wipers to fulfill their function perfectly even during the cold season of the year.

SUMMARY OF THE INVENTION

The invention generally is in a windshield whose lower area, that is the area that extends into the recessed space below the hood, is provided with an electric heating resistance and an opaque layer which is capable of absorbing the radiation heat disposed between the electric heating resistance and the windshield wipers, and within the area of the wind shield provided with the electric heating resistance.

The windshield, according to the invention, provides a number of advantages which flow from the combination with the windshield of an electric heating reistance and an opaque layer. To this end, the portion of radiation of heat which shall emanate from the electric heating resistance increases the temperature of the surface of the windshield on which the windshield wipers rest and, as such, increases the overall effectiveness in total heating of the windshield. The opaque layer provides advantages over and above its capability of functioning as a heat absorbing layer. Thus, because of its opacity the electric heating resistance is not visible from the outside. Accordingly, heating conductors which otherwise would obscure the field of view may be used. Further, those parts of the body of the vehicle that lie behind the extending portion of the windshield will be hidden from view. This is particularly advantageous since these parts of the body of the vehicle oftentimes detract from the aesthetics of the vehicle. Also, foreign contaminants which may lodge in that area and which detract from the aesthetics of the vehicle as well will be hidden. The opaque layer obviates the requirement of gaining access to that area which in many instances is difficult. Finally, in many instances the windshield is glued with the aid of an adhesive mass to a supporting structure of the body within the recessed space. If the opaque layer is extended upwardly along the windshield it will also serve to cover and, therefore, hide the entire adhesive region.

According to one embodiment of the invention, the windshield is a laminate including an inner and outer glass pane with an intermediate layer of thermoplastic material. In this embodiment the electric heating resistance is located between the inner and outer glass panes, in the intermediate layer, and the opaque layer is disposed on the outer glass pane. The opaque layer may be in contact with the intermediate layer or else on the free surface of the outer glass pane on which the windshield wiper or wipers rest. In the event that the opaque layer is disposed on the free surface preferably the opaque layer will consist of a durable and abrasion resistant material, for example, an enamel layer.

Preferably, the electric heating resistance consists of a family of heating conductors, each of an enamel-like composition. While this form of electric heating resistance is preferred, the electric heating resistance may also consist of a continuous metal or semiconductor layer. The opaque layer capable of absorbing heat radiated by the electric heating resistance, likewise, is an enamel-like material. The electric heating resistance, first-mentioned and the opaque layer are baked in the windshield at elevated temperature.

In another embodiment of the invention both the electric heating resistance and the opaque layer are disposed on the outside surface of the inner glass pane. It may be effective to dispose an additional opaque layer of an enamel-like material on the electric heating resistance which, in this particular embodiment is disposed on the opaque layer baked on the outer surface of the inner glass pane. The additional opaque layer serves as a protective layer for the electric heating resistance against possible corrosive attack of the atmosphere to which the electric heating resistance otherwise would be directly exposed.

Advantageously, the opaque layer disposed between the windshield wiper and the electric heating resistance has a heat conductivity capability which is equal to or greater than that of the glass panes of the windshield. If, as discussed in the last-mentioned embodiment of the invention, the electric heating resistance is disposed between two opaque layers, the opaque layer facing away from the windshield wiper, that is, the additional opaque layer, may have a lower heat conductivity capability than the opaque layer disposed between the electric heating resistance and the windshield wiper.

The invention, also is in a process for the production of a windshield, as heretofore described. The process comprises the steps of applying with the aid of screen printing process a continuous closed layer of a printable baking paste to a surface of glass pane, drying the layer, imprinting an electric heating resistance on the dried layer, and drying the electric heating resistance. The process of the invention, also, contemplates applying an additional continuous closed layer of a printable baking paste with the aid of a screen printing process on the electric heating resistance, and baking the layers printed one on top of another in a single heat treating process.

Further characteristics and advantages of the invention will develop from a reading of the description to follow and the various embodiment and forms of the invention will become clear through this reading and reference to the drawing.

BRIEF DESCRIPTION OF DRAWING

FIG. 1 illustrates a windshield of the invention mounted to the body of a vehicle which is partially shown, the windshield being shown as a part of a vertical longitudinal section along the central axis of the vehicle;

FIG. 2 illustrates one form of the windshield, in partially exploded fashion;

FIG. 4 illustrates a form of electric heating resistance;

FIG. 5 is an elevational view of a further form of the invention illustrating the windshield as seen from the outside; and FIG. 6 is an enlarged view in section as seen along the line 6—6 in FIG. 5.

BEST MODE FOR CARRYING OUT THE INVENTION

Figure 3:
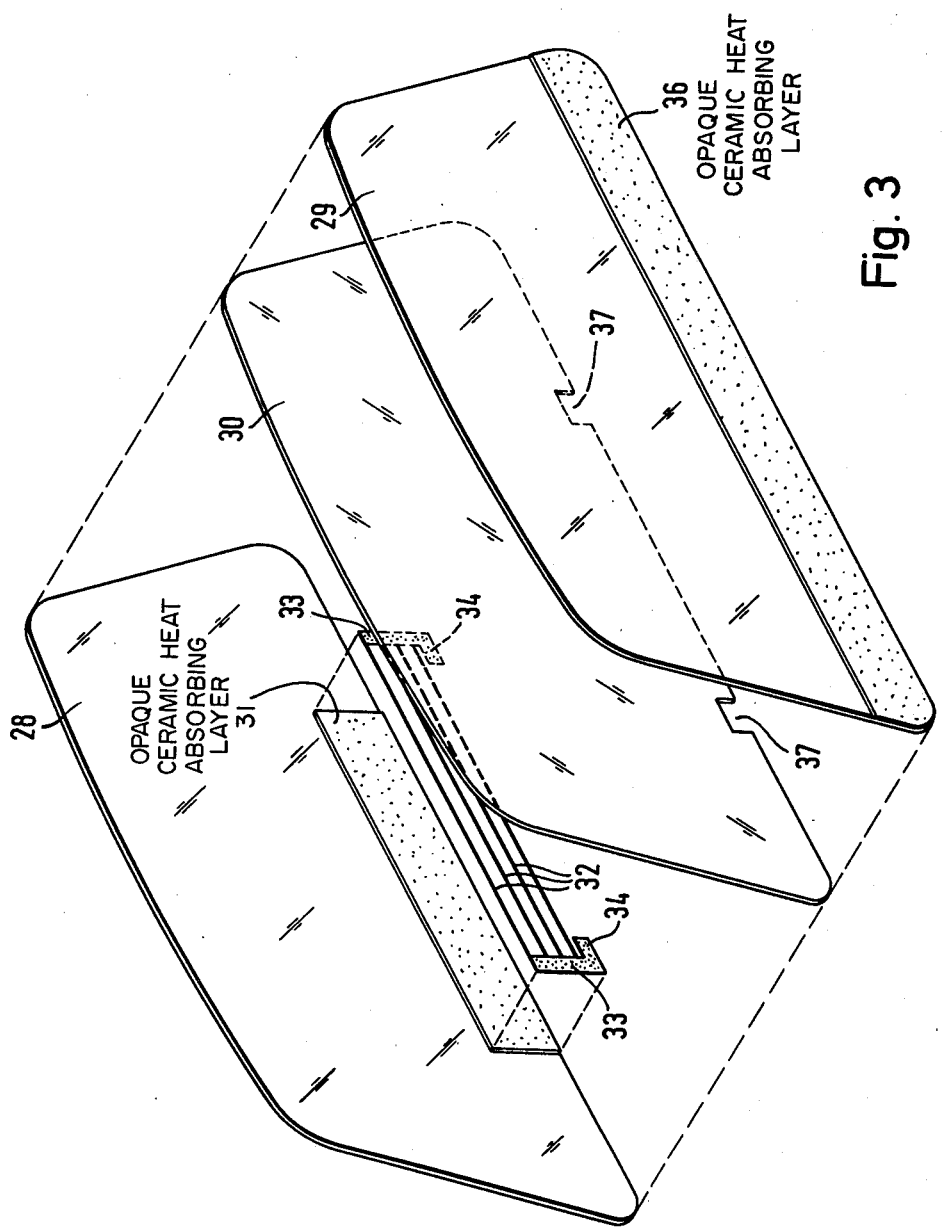
FIG. 3 illustrates another form of the windshield, likewise in partially exploded fashion.

Referring to FIG. 1, the windshield 1 is located to the opening in the body 2 of a vehicle thereby to close that opening to the interior. A frame 3, molded on the sheet metal of the body around both the sides and top of the opening, supports the windshield and a ribbon 4 of adhesive secures the supported windshield to the frame. Molding 5 in the form of an ornamental profile is secured by conventional means to the frame to cover the adhesive ribbon.

According to the invention, windshield 1 extends into a hollow space 8 below the level of hood 11. The space accommodates a motor 9 for each windshield wiper 10 and a support in the form of a spar 7 comprising a portion of body 2. A ribbon 6 of adhesive secures the portion of windshield 1 which extends into space 8 to spar 7.

Each windshield wiper 10 in its position of rest resides on this lower part or extending portion of windshield 1. The hood 11 terminates at a distance from the windshield 1 to mount as trip of molding 12 and at the same time permit movement of each windshield wiper through the remaining gap from and to return to space 8 so that they are not visible from the front of the vehicle. Since each windshield wiper in the rest position is recessed in the space, the individual windshield wipers will not represent an obstacle for air currents moving along the windshield.

The lower part or extending portion of windshield 1 is denoted by the numeral 15, and as may be seen in FIGS. 1 and 2 comprises an area whose top to bottom dimension is about one-fifth (1/5) of the total width of the windshield. As previously generally discussed, each windshield wiper is supported by the windshield 1 and located in the rest position in a disposition within the lower part 15. The electric heating resistance and opaque layer are located within the lower part 15 of windshield 1, also.

The opaque layer, as will be particularly discussed below, extends to an upper limitation 16 (see FIG. 1) which lies along a line which is closer to the top of windshield 1 than ribbon 6 of adhesive. In this way, the adhesive ribbon is covered by the opaque layer providing the function of molding 5.

With particular reference to FIG. 2, the windshield 1 is illustrated as a laminated glass pane comprising an outer glass pane 18, an inner glass pane 19 and of an intermediate layer 20 of a thermoplastic material, such as polyvinyl butyral, interconnecting the two glass panes which are formed of silicate glass. As seen in FIG. 2, the opaque layer, denoted by numeral 21, is disposed on the outer surface of the inner glass pane 19. The opaque layer is in the form of a continuous, light impermeable material, preferably dark and capable of absorbing heat rays radiated by the electric heating resistance. The opaque layer may be formed of a black enamel material. A second layer is disposed on opaque layer 21. The second layer comprises heating conductors 22 and bus bars 23 connected at the ends of the conductors arranged as a parallel family. The heating conductors 22 and bus bars 23 are formed of an enamel-like composition including a conductive material, such as silver particulate. An extension 24 may be carried by each bus bar 23 in the event that the spacing of the bus bars does not permit connection of the electric heating resistance to a source of current. The extensions, thus, will permit suitable connecting elements to be soldered to the electric heating resistance.

A continuous layer 26 of the same material and makeup as the opaque layer 21 is positioned directly on the second layer. A recess 27 coextensive with each extension 24 is formed in opaque layer 26 so that the surface of the extensions are free for soldering purposes.

In the described embodiment, the opaque layers 21, 26 and the second layer comprising the electric heating resistance disposed on the outer surface of inner glass pane 19 are attached successively by a screen printing method, as is known. The opaque layer 21 is applied to the outside surface of inner glass pane 19, and dried; the second layer is applied to the opaque layer 21, and dried; and the opaque layer 26 is applied to the second layer after which the glass panes placed one on top of the other in a bending furnace are heat treated to a softening temperature, baked together and sealed into a continuous construction. The several layers, therefore, will be anchored in the windshield 1 which may have undergone bending.

The opaque layer 21 in its flat extension corresponds generally to the flat extension of the heating conductors 22 inclusive of the bus bars 23. By virtue of the heating conductors 22 extending over the entire width of the windshield in the arrangement first described wherein the opaque layer is disposed juxtaposed to the inner surface of glass pane 18, or the inner surface of inner glass pane 19, and contacting the thermoplastic layer 20, a problem may develop when the glass panes are bent by pairs. To this end, following fusing and baking of the opaque layers, it may be that a bonding or anchoring of an opaque layer may take place with the other glass pane at indeterminate locations. This may result in difficulty in separating the two glass panes after joint bending.

The form of the invention of FIG. 3 serves to counter these problems. According to this form, the flat extension of the electric heating resistance is throughout the central region of the windshield. The assumption is taken in this form of the invention that the repository area of each windshield wiper in its rest position will be in that region, also.

As illustrated in FIG. 3, the windshield comprises an outer glass pane 28, an inner glass pane 29 and an intermediate layer 30. The inner and outer glass panes are of silicate glass and the intermediate layer is of a thermoplastic material, such as polyvinyl butyral.

A procedure, generally as discussed, may be implemented in the fabrication on the windshield of FIG. 3. Thus, a layer 31 comprising a closed layer of printable, black, ceramic material is applied to the inner surface of outer pane 28 within the central region of the lower portion of the windshield wherein heating is desired. The layer may be applied by a screen printing process. After the layer is dried the electric heating resistance comprising heating conductors 32 and bus bars 33 are applied to the layer. Application of what comprises a second layer formed by a printable silver paste, likewise, is applied by a screen printing technique. The second layer is dried and a layer 36, of the same ceramic color of which the layer 31 consists, is applied in similar manner to the outside surface of inner glass pane 29. The layer 36 extends over the entire width of the windshield and forms the opaque layer, while the layer 31 serves the function essentially of the heat ray absorption. A pair of connecting surfaces 34 formed along the lower edges of bus bars 33 and a pair of recesses are located along the lower edge of the intermediate layer 30. The recesses render the connecting surfaces accessible for soldering receipt of contact tongues which project downwards from the windshield and which provide electrical connection to a source of current.

After application and drying of the layers 31, 32, 33 and 36, the glass panes 28, 29 are received one on top of the other and subjected to joint bending under the effect of gravity. During joint bending, the two glass panes in the central field are spread apart somewhat because of the higher temperature of the outside skin. The layers 31, 32 and 33, in the temperature range in which they are fused on and baked into the inner surface of the outer pane 28, do not come into contact with the inner surface of the inner pane 29. At a later time during the overall process when there shall have been an equalization of the temperature, the inner pane 29 again will fit against the outer pane 28. The fit will occur throughout the area of the layer 31, which together with layers 32, 33 will have solidified to the point that no bonding or anchoring of a layer to the surface of the inner pane 29 will be experienced.

It is to be understood that the ceramic colors comprising the opaque layers for absorbing the heat rays, and the silver pastes comprising the heating conductors must be compatible so that at equal temperatures they will fuse and bake without mutual disturbances.

Such ceramic products may be obtained from the firm BLYTHE COLOURS B.V., among possible others. The ceramic product preferably will have a black, baked-in color and a bake-in temperature range between 580° and 620° C. The product is identified as 39.269/5/63. The silver paste likewise has a bake-in range between 580° and 620° C. The product is identified as SMV 197 A/S-70%/18/63.

Referring to FIG. 4, there is illustrated the form of electric heating resistance comprising a continuous metal or semiconductor layer. In the Figure, the layer is denoted by the numeral 22a, while the bus bars and extensions are denoted by the numeral 23a and 24a, respectively.

Referring to FIGS. 5 and 6, there is illustrated a further form of the invention wherein the windshield comprising an outer glass pane 38, an inner glass pane 40, and an intermediate layer 41 of a thermoplastic material, as previously discussed, supports an opaque layer 39 on the outer surface of the outer glass pane. The opaque layer is located within the same region of the windshield as are the opaque layers 21,31. The opaque layer 39, further, is formed of the same material and located to the outer surface of the outer layer in a manner similar to the manner of location of the opaque layers 21, 31. The form of the invention, as may be seen in FIG. 6, provides that structure 41 forming the electric heating resistance comprised of a heating conductor and bus bars is located on the inner surface of the outer layer 38. The heating structure, thus, is hidden from view from the front of the windshield by the opaque layer 39.

We claim:

1. A windshield for motor vehicles characterized by a transparent panel defining a vehicle windshield having an upper region normally within the driver's field of vision and a lower region normally not within the driver's field of vision, an electric resistance heating means for heating said lower region, said heating means carried by said windshield only on said lower region, and a continuous layer of material opaque to ambient light and of a size at least coextensive with the area of said heating means within said lower region, said continuous layer also carried by said windshield in position so that said heating means is not visible from the front of said windshield, and said material being formed of a heat radiation absorbing substance.

2. The windshield of claim 1 wherein said transparent panel comprises a lamination formed by an outer glass pane, an inner glass pane, and a plastic layer therebetween, wherein said heating means is disposed between said inner and outer glass panes thereby being juxtaposed said plastic layer, and said layer of material is disposed on a surface of said outer glass pane.

3. The windshield of claim 2 wherein said layer of material is disposed on the outer surface of said outer glass pane and said heating means is disposed on the inner surface of said outer glass pane.

4. The windshield of claim 3 wherein said layer of material is disposed on the inner surface of said outer glass pane and said heating means is disposed on said layer of material.

5. The windshield of claim 1 wherein said heating means comprises a plurality of individual conductors, said conductors arranged as a family of parallel conductors, a bus bar at each end and in electrical connection with said conductors, and a connector formed on each bus bar adapted to connect said heating means to a source of current.

6. The windshield of claim 5 wherein said conductors are formed of an enamel-like composition.

7. The windshield of claim 1 wherein said heating means comprises a continuous layer of metal, and means carried by said continuous layer of metal adapted for connecting the same to a source of current.

8. The windshield of claim 1 wherein said heating means comprises a continuous layer of semiconductor material, and means carried by said continuous layer of semiconductor material adapted for connecting the same to a source of current.

9. The windshield of any one of claims 6, 7 or 8 wherein said opaque and heat radiation absorbing material comprises an enamel-like layer.

10. The windshield of claim 1 wherein said transparent panel comprises a lamination formed by an outer glass pane, an inner glass pane, and a plastic layer therebetween, and wherein said heating means and continuous layer of material are disposed on different surfaces of said panes.

11. The windshield of claim 1 wherein said transparent panel comprises including a lamination formed by an outer glass pane, an inner glass pane, and a plastic layer therebetween, said layer of material disposed on an outer surface of said inner glass pane, said heating means disposed on said layer of material, and further including a second opaque layer of material, said opaque layer of material disposed on said heating means thereby to dispose said heating means between said layers.

12. The windshield of claim 11 wherein said first-mentioned layer of material has a heat conductivity capability greater than that of said second layer of material.

13. The windshield of claim 1 wherein said continuous layer of material has a heat conductivity capability at least equal to that of said windshield.

14. The windshield of claim 1 wherein said lower region extends substantially across the width of said windshield.

* * * * *